Patented Sept. 24, 1929

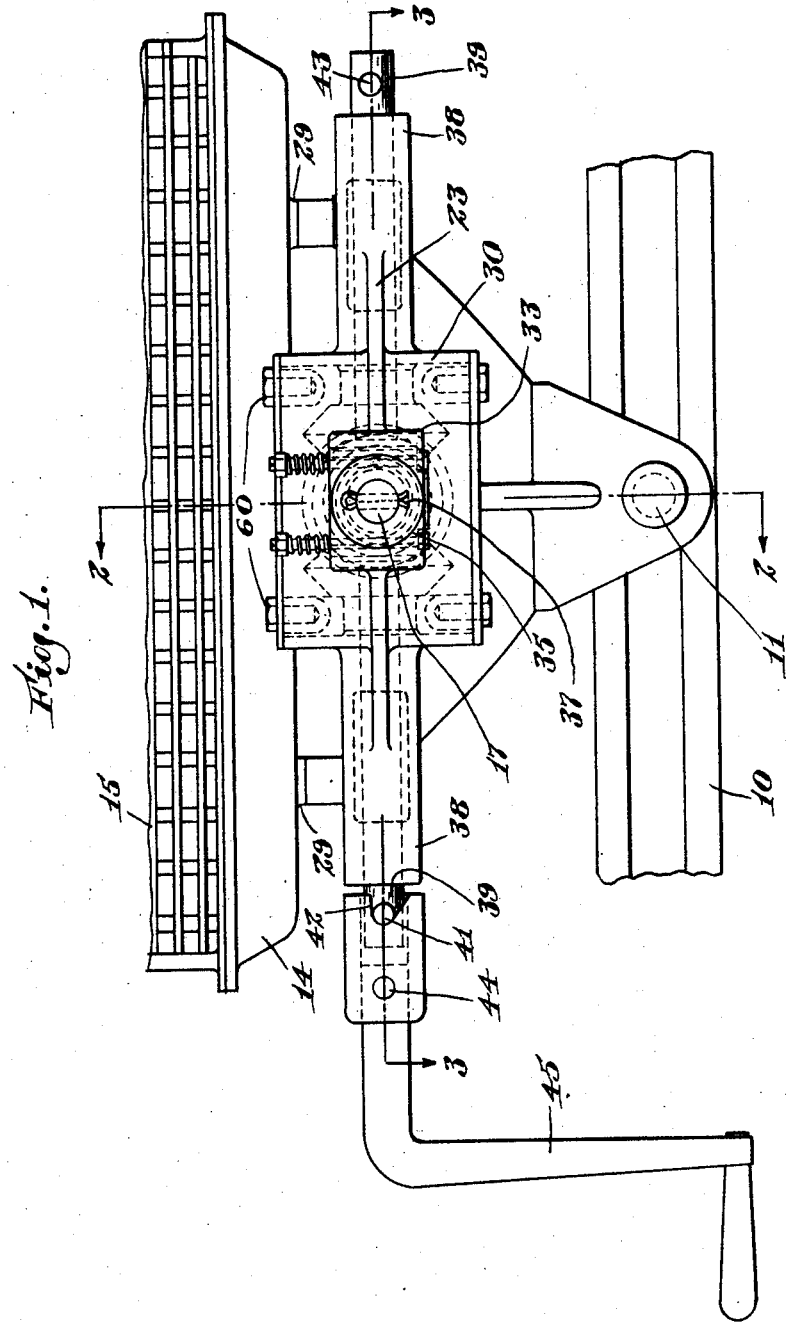

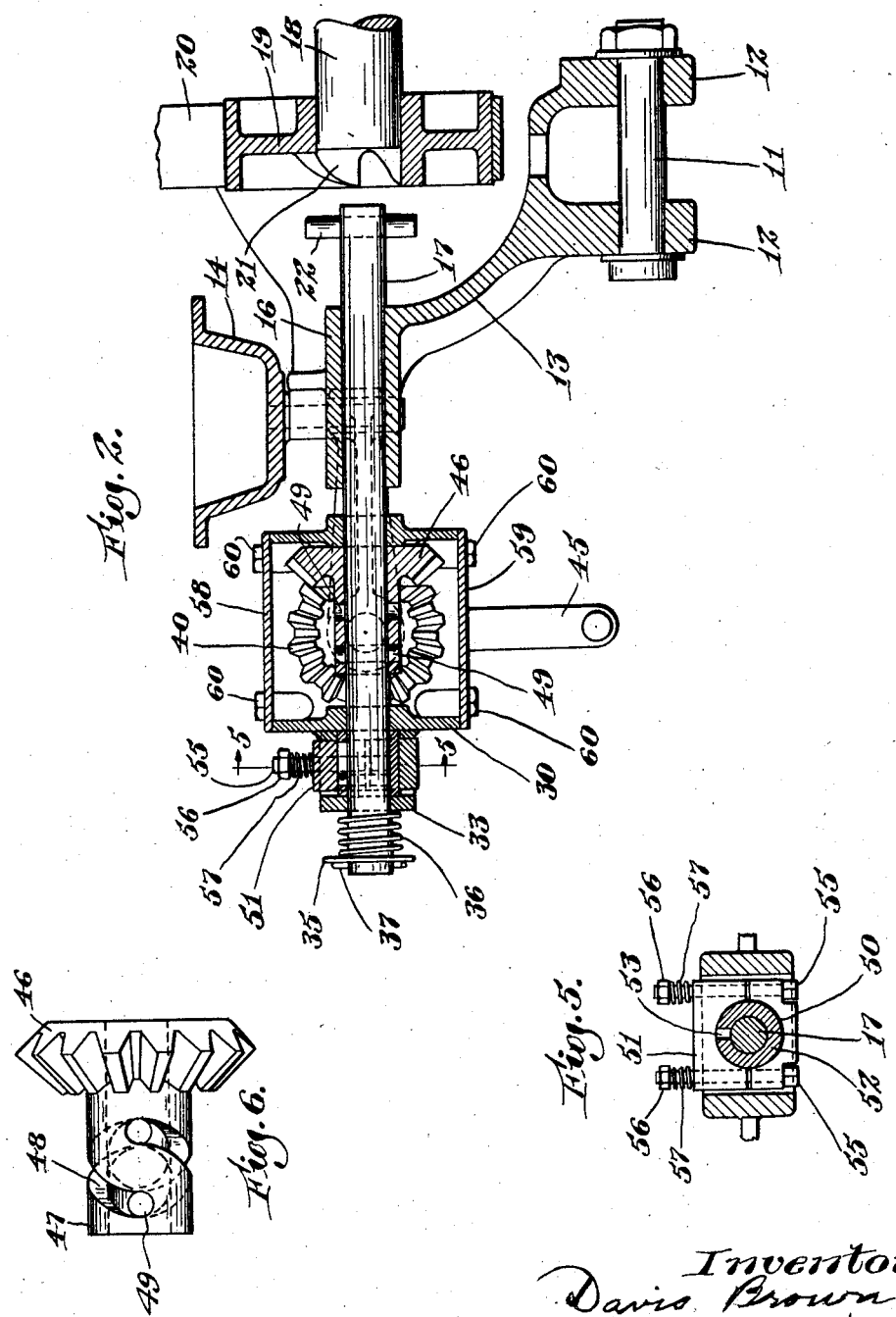

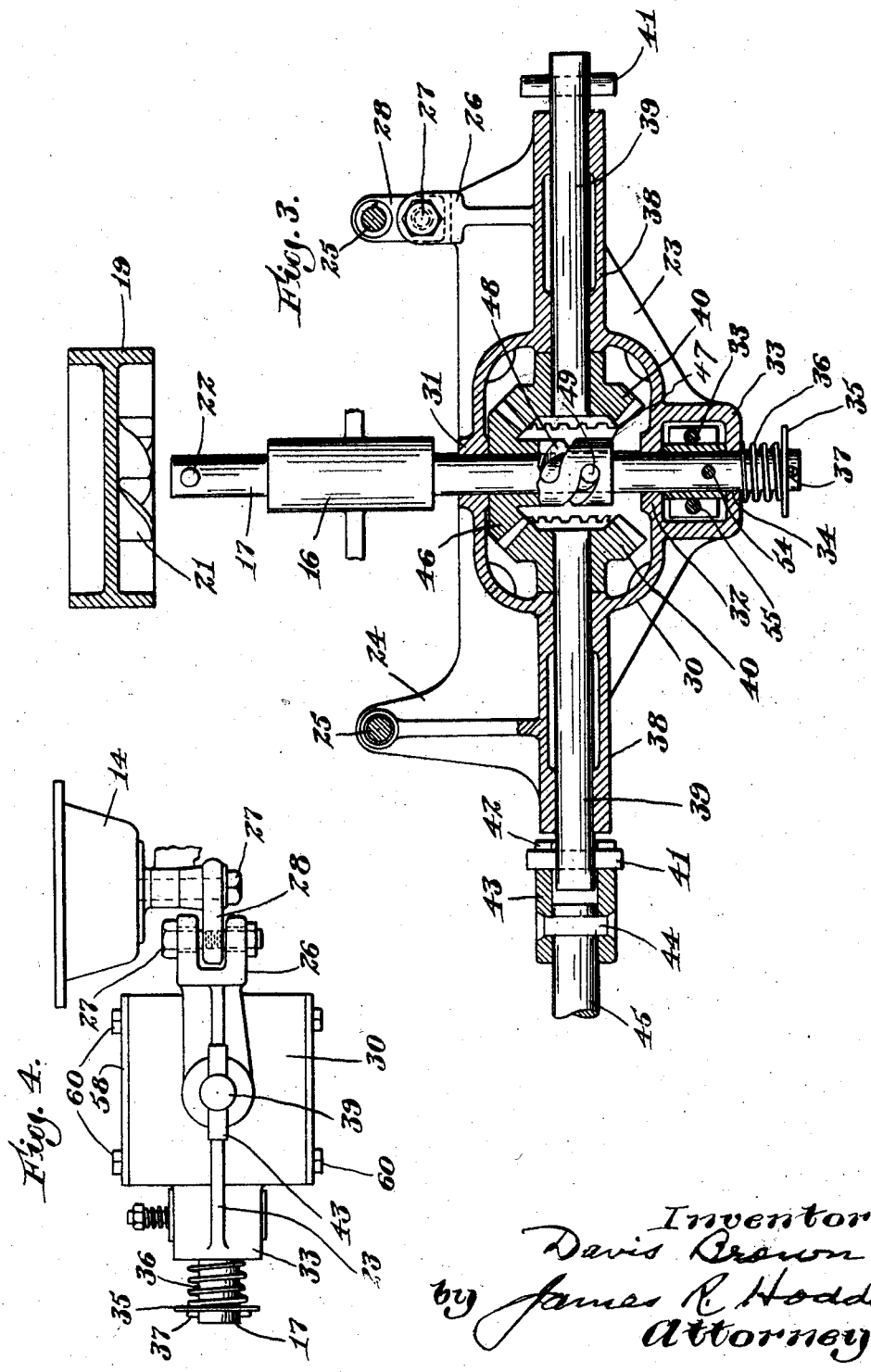

1,729,150

UNITED STATES PATENT OFFICE

DAVIS BROWN, OF BUCYRUS, OHIO

SIDE CRANKING DEVICE

Application filed April 27, 1926. Serial No. 104,997.

My present invention relates to tractors and more particularly to an improved side cranking arrangement for tractor engines.

In road-working and hauling machines, such as are commonly constructed at the present time, and in which machines the power plant of tractors may be utilized as the power plant of the road-working or hauling machine, difficulty has been experienced in providing means for readily starting the power plant. As is well known, the power plants of tractors and the like are not provided with self-starting devices and it is the universal custom to start such power plants by means of a crank. In certain types of these road-working and hauling machines, the power plant of a tractor has its front end supported on or adjacent to the rear end of a forwardly extending arched frame and on such arched frame are placed not only the operating mechanisms for the tools carried on the frame, but also the platform on which the operator of the machine not only controls the tools carried by the frame but also controls the power plant of the device. The starting crank of the power plant is, of course, available and in view under the arched portion of the frame and sometimes under the operator's platform but is not in position where it may be readily manipulated. Various attempts have been made to devise a means for operating said crank or turning over the engine shaft by means extending laterally of a frame and, as far as I am aware, none of such devices have been successful.

In my present invention, I have supplied this existing want and have produced a side cranking device which may be readily attached to the lower forward portion of the power plant of the road-working or other machine, said side cranking device being associated with the normally free running end of the crank shaft of the engine. I preferably make my device so as to be operable from either side of the framework of the machine and also make the device as an attachment which is readily secured to the bolster supporting or front of the engine and the radiator therefor.

The principal object of my invention, therefore, is an improved side cranking device for tractor engines and the like.

Another object of my invention is a unitary structure adapted to be attached to the front end of a tractor engine.

Other objects and novel features of the construction and arrangement of parts comprising the improved structure will appear as the description of the invention progresses.

In the accompanying drawings illustrating the preferred embodiment of my invention, Fig. 1 is a front elevation;

Fig. 2 is a sectional side elevation on the line 2—2 of Fig. 1;

Fig. 3 is a sectional plan view on the line 3—3 of Fig. 1;

Fig. 4 is a partial right side elevation;

Fig. 5 is a sectional elevation on the line 5—5 of Fig. 2, and

Fig. 6 is an elevation of the combined pinion and cam sleeve.

Referring to the drawings, 10 designates the front axle pivotally mounted on a horizontal king pin 11 secured to the downwardly spaced lugs 12, formed integral with a casting 13 that is secured ordinarily to the front portion of the power plant of the tractor. This member 13 extends upwardly and forwardly and has secured to its upper front end the radiator shell 14, on which is secured the usual radiator 15. Formed in the casting 13 is a sleeve bearing 16 in which is rotatably mounted a starting shaft 17, that is in axial alinement with the usual crank shaft 18 of the power plant of the tractor, this shaft having secured at its front end a fan pulley 19 and over which runs the usual fan belt 20. Formed on the inner front face of the pulley 19 are ratchet teeth 21, with which may engage the diametrically arranged pin 22 secured to the shaft 17 adjacent the rear end thereof. As ordinarily arranged, the shaft 17 is formed integral with a crank and may be pushed inwardly or to the right, as shown in Fig. 2, until the pin 22 engages with the ratchet teeth 21. By this means, the crank shaft 18 is rotated in a clockwise direction until the engine starts, when the speed of the engine, being greater than the speed of revolution of the shaft 17—which is manually operated—the curved back of the ratchet teeth 21 will ride or force the shafts 18 to the left, as viewed in Fig. 2, until the same comes into substantially the position shown in such figure. This retrograde movement of the shaft 17 is ordinarily assisted by a spring.

23 designates a casting having formed integral therewith and extending rearwardly therefrom, one side thereof, a member 24, this member 24 being drilled to receive a vertically positioned bolt 25, to be hereinafter referred to. Also formed integral with the member 23, extending rearwardly therefrom, at the side opposite the member 24, is a member 26, which is forked, as clearly shown in Fig. 4, and rotatably mounted in the forked ends on bolt 27, is a link 28, the rearward end of this link being drilled to receive a second vertically mounted bolt 25, to be hereinafter referred to. By referring to Fig. 3, it will be seen that the bolts 25 in the member 24 and link 28 respectively are in substantially the same vertical plane that passes vertically and at right angles through the sleeve bearing 16. On the under face of the radiator base 14 are formed bosses 29, drilled and tapped to receive the upper threaded end of the bolts 25 and such bolts 25, passing upward through the drilled portion of the member 24 and the drilled portion of the link 28, screw into such bosses 29 and firmly secure the member 23 to the radiator base 14 or in the relative position thereto, as shown in Fig. 1. Centrally formed on the member 23 is a casting 30 and on the rearward surface of such casting 30 is formed a bearing 31. On the front surface of such casting 30 is formed a bearing 32 and also a casting 33, which, in turn, has formed on its front face a bearing 34. The bearings 31, 32, and 34, when the member 23 is secured, as above described, to the under face of the radiator base 14, are not only in alinement with each other but are in substantial alinement with the bearing sleeve 16. Should the group of bearings 31, 32, and 34, and the sleeve bearing 16 not come exactly into alinement by proper manipulation of the bolt 27 and the bolt 25, both associated with the link 28, such groups of bearings may be brought into substantial alinement with each other. The shaft 17 fits, therefore, not only a bearing in the sleeve bearing 16, but also a bearing in the bearing members 31, 32 and 34, and extends forwardly beyond the limits of the casting 33 a sufficient distance to allow the placing thereon of a washer 35 and a coil spring 36, the washer being prevented from ready removal from the shaft 17 by a cotter pin 37. Formed integral with the member 23 and extending out laterally from the casting 30 on each side thereof, are bearing sleeves 38, these bearing sleeves extending, therefore, at right angles to the shaft 17. Rotatably mounted in each of the sleeve bearings 38 are shafts 39 and secured to the inner ends of each of said shafts are bevel gears 40 of any desired or convenient diameter and pitch. The shafts 39 extend outward beyond the limits of the sleeve bearings 38 and extending through such ends are pins 41, these pins being adapted to be engaged by the ratchet teeth 42, formed on a sleeve 43, secured by pin 44 to the end of a starting crank 45. Slidably mounted on the shaft 17 but rotatable therewith, is a bevel gear 46 which meshes with and may be driven by either or both of the bevel gears 40. Formed integral with the bevel gear 46 is a hub sleeve 47 and in this hub sleeve is formed a cam race 48, in which is adapted to work a pin 49 that is secured to and extends diametrically of the shaft 17. In the casting 33 is arranged a split bearing block composed of the upper and lower members 50 and 51 respectively. Rotatably mounted in the members 50 and 51 is a split bearing sleeve 52, the split, as indicated by the reference numeral 53, being wide enough to allow free sliding movement of a pin 54 that is secured to and extends radially outward from the shaft 17. Through the members 50 and 51, on either side of the bearing sleeve 52, are threaded bolts 55, these threaded bolts extending upwardly beyond the top of the member 51 and are provided with nuts 56 in their ends. Between the under surface of the nuts 56 and the upper surface of the bearing member 51 and on the bolts 55 are coiled springs 57, the function of the bolts 55 and spring 57 being to hold the bearing members 50 and 51 together under yielding tension and this tension may be regulated by proper adjustment of the nuts 56. The degree of freedom of rotary movement of the sleeve 52, and therefore the shaft 17, in the bearing members 50 and 51, may be regulated at will. This tension is ordinarily regulated so that preliminary rotary movement of the bevel gear 46 will cause, through the cam race 48 and pin 49, a longitudinal movement of the shaft 17 to the right, as viewed in Fig. 2, and until the pin 22 engages with the ratchet teeth 21 on the pulley 19. The bevel gears 40 and 46 are preferably arranged to run in either grease or oil and in order that this may be possible, I have provided top and bottom covering plates 58 and 59 respectively for the casting 30, these cover plates being held in position by bolts 60.

The operation of my improved device is as follows, it being assumed that said device has been constructed and assembled as above described and that the power plant to which it is attached is incorporated in a road-grading or other machine where ordinarily it is difficult to utilize the ordinary form of manual starting device:

The operator takes the crank 45 and places the same on either of the shafts 39 in the position shown, for example in Fig. 1. Should it be so desired, two operators may each take a crank 45 and place said cranks on the shafts 39 on either side of the machine. The crank is turned in such a way as to rotate the shaft 39 in a clockwise direction and, therefore, to rotate the shaft 17 in a clockwise direction. The preliminary rotation of the shafts 39 will, however, cause, through the rotation of the gears 40, the rotation of the gear 46 in a clockwise direction through practically a full revolution before any rotative movement takes part on the place of the shaft 17. The rotative movement of the gear 17 will cause the cam race 48 on the sleeve thereof to engage with the pin 49 on the shaft 17 and said shaft 17 will move rearward or to the right, as shown in Fig. 2, until the pin 22 thereon engages with the teeth of the ratchet 21. At this time, the pin 49 will have engaged with the end of the cam race 48 and further rotative movement of the gear 46 will cause a rotative movement of the shaft 17. During this longitudinal movement of the shaft 17, the spring 36 will have been compressed and will remain compressed until, for example, the engine, of which the crank shaft 18 forms a part, starts in motion, when the more rapid motion of the engine shaft 18 will cause the ratchet teeth 21 to force the shaft 17 to the left, as viewed in Fig. 2, and such movement will be assisted by the expansion of the spring 36.

While I have necessarily shown the preferred embodiment of my invention somewhat in detail, it is to be understood that I may vary the size, shape, and arrangement of parts comprising the device within wide limits without departing from the spirit of the invention.

Having thus described my invention, what I claim as new is:

An improved side cranking device for internal combustion engines comprising a base, means for adjustably mounting said base in position on an internal combustion engine, a starting shaft mounted for longitudinal and rotary movement in said base, said longitudinal movement being toward and from the crank shaft of the internal combustion engine and in axial alignment therewith, spring means mounted on said starting shaft and associated with said base, whereby the starting shaft is yieldingly held in operative position with relation to the engine crank shaft, a bevel gear rotatably mounted on said starting shaft, a cam formed in the hub of said gear, a cam pin extending radially outward from said starting shaft and engaging in said cam, a pair of shafts rotatably mounted in said base in alignment with each other, at right angles to the starting shaft and on opposite sides thereof, bevel gears on each of said pair of shafts meshing with the bevel gear on the starting shaft, and means associated with said pair of gears for rotating the starting shaft.

In testimony whereof, I have signed my name to this specification.

DAVIS BROWN.